Figure 1:
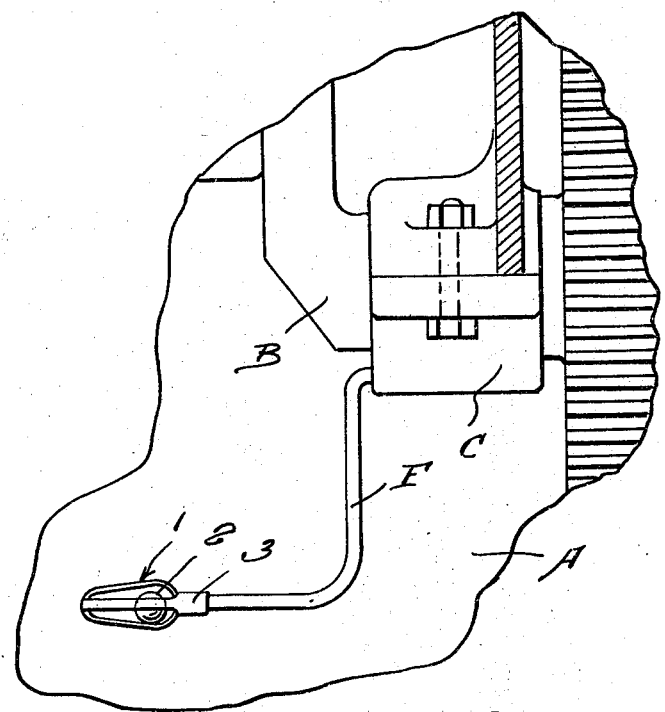

Sept. 20, 1932.   J. E. KUMMER   1,878,408
LUBRICANT FLOW CHECK
Filed June 16, 1928

Inventor
J. E. Kummer,

By Clarence A. O'Brien
Attorney

Patented Sept. 20, 1932

1,878,408

UNITED STATES PATENT OFFICE

JAMES EDWARD KUMMER, OF JUNCTION CITY, KANSAS

LUBRICANT FLOW CHECK

Application filed June 16, 1928. Serial No. 285,964.

The present invention relates to improvements in means for checking the flow of lubricant from the crank case of an automobile when the latter is inclined as when dumping grain from a tiltable platform. In dumping grain from trucks at modernly equipped mills, the truck runs upon a tiltable platform and is tilted by the movement of the platform for dispensing the grain into underlying beds.

A disadvantageous problem in this manner of dumping grain resides in the wasteful and damaging escape of oil from the shaft bearing in the lower end of the crank case of the tilted truck. This waste is not only costly but frequently results in the ruination of a valuable quantity of the grain.

The prime object of this invention is to provide means whereby this escape of oil will be checked while the truck is in a tilted position.

Another object is to provide a simple check device which may be associated without difficulty with the present end bearings of a crank shaft.

After considering the following specification and claims, other important objects and advantages of the invention will be realized.

In the drawing:—

Figure 2:
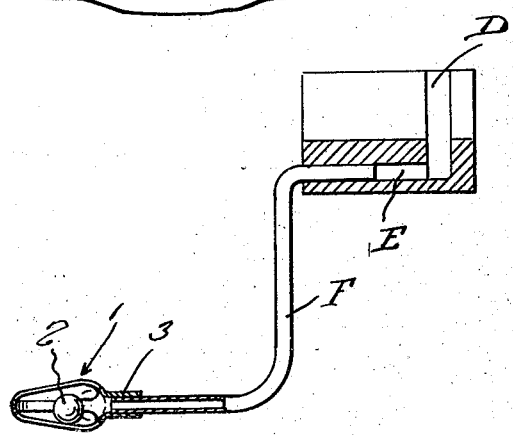

Figure 1 represents a fragmentary portion of the crank case and end bearing of a crank shaft in partial sectional view and disclosing in side elevation the improved lubricant check, and Figure 2 is a front elevation of the lubricant check in partial sectional view and shown associated with the lower section of the crank shaft end bearing.

Referring more particularly to the drawing wherein like numerals designate like parts, a crank case is fragmentarily shown and designated by A, wherein the crank shaft B is operative with its respective ends journaled through end bearings, one of which is shown in the drawing and designated by C. The respective sections of the bearing C are formed with a continuous groove D in which the thrust collar of the crank shaft, not shown, is seated, and from which the usual drain bore E extends. In some makes of automobiles, a drain tubing F is employed with one end inserted within the drain bore E to permit the lubricant to drain into the crank case. However, it is desirable that this tubing be employed regardless of whether the same is part of the equipment of the automobile with which the present check is to be associated or not.

The invention resides specifically in providing a cage generally referred to by numeral 1. This cage may be constructed of a tubing closed at one end and slitted for a substantial portion of its length. The strips produced by these slits are then bulged outwardly in the manner shown in the drawing to provide a cage in which a ball 2 is operable.

The end of the cage opposite to the open end thereof is thus provided with a sleeve 3 for snug engagement over the end of the tubing F.

Obviously, when the engine of the truck is in tilted position and the illustrated bearing C is in a lower position than the opposite end bearing, the ball 2 being of greater diameter than the opening within the sleeve 3, will seat against the inner end thereof to close the passageway through the tubing F and prevent any escape of lubricant therethrough. When the engine assumes its normal horizontal position, the ball 2 will return to a position within the cage 1 spacedly from the inner end of the sleeve 3, thus allowing the drain of lubricant from the bearing C back into the crank case.

It is also to be understood, that a check of this construction is to be associated with both the front and rear end bearings, so regardless of which direction the truck is tilted in, the novel check will sustain the oil from escape from the crank case.

Having described the invention, what is claimed as new is:—

1. The combination of a crank case in an automobile, adapted to contain oil and having a shaft bearing in its portion toward one end of the automobile, a shaft in said bearing, a conduit extending downwardly in the crank case from the bearing and communicating at its upper end with said bearing, and an oil control check valve complementary to said conduit, confined for limited movement, and arranged when the automobile and crank case are substantially horizontal to gravitate from its seat and also arranged when the automobile and crank case are inclined in one direction from the horizontal to gravitate to its seat and check the flow of oil from the case to the bearing and in that way prevent waste of oil through and from the bearing.

2. The combination of a crank case in a motor vehicle such as an automobile or airplane, adapted to contain oil and having a shaft bearing in its portion toward one end of the vehicle, a shaft in said bearing, a conduit extending downwardly in the crank case from the bearing and open at its lower end and an oil control check valve complementary to the said conduit, confined for limited movement and arranged when the vehicle and crank case are substantially horizontal to gravitate from its seat and also arranged when the vehicle and crank case are inclined in one direction from the horizontal to gravitate to its seat and check the flow of oil from the case to the bearing and in that way prevent waste of oil through and from the bearing.

3. In combination, a crank case of a motor vehicle having an end bearing, a tube communicating with said bearing and having its lower end open and disposed in the lower portion of the crank case and directed longitudinally inwardly with respect to said end bearing, a valve cage on said lower end of the tube, and a valve confined and movable in said cage and adapted when the crank case is horizontal to rest away from the lower end of the tube and also adapted when the motor vehicle and the crank case are tilted or inclined longitudinally from the horizontal so that the end bearing is in a lower position than when the motor vehicle and crank case are horizontal, to seat against the open end of the tube and thereby prevent wasteful discharge of lubricant from the crank case through said end bearing.

In testimony whereof I affix my signature.

JAMES EDWARD KUMMER.